(12) United States Patent
Bernard et al.

(10) Patent No.: US 10,294,116 B2
(45) Date of Patent: May 21, 2019

(54) SYNTHETIC RUTILE PRODUCTS AND PROCESSES FOR THEIR PRODUCTION

(71) Applicant: ILUKA Resources Limited, Perth (AU)

(72) Inventors: Nicholas Glen Bernard, Capel (AU); John Maxwell Bultitude-Paull, Capel (AU)

(73) Assignee: ILUKA Resources Limited (AU)

( * ) Notice: Subject to any disclaimer, the term of this patent is extended or adjusted under 35 U.S.C. 154(b) by 0 days.

(21) Appl. No.: 15/552,546

(22) PCT Filed: May 5, 2016

(86) PCT No.: PCT/AU2016/050323
§ 371 (c)(1),
(2) Date: Aug. 22, 2017

(87) PCT Pub. No.: WO2016/176732
PCT Pub. Date: Nov. 10, 2016

(65) Prior Publication Data
US 2018/0050921 A1    Feb. 22, 2018

(30) Foreign Application Priority Data

May 5, 2015 (AU) ................................ 2015901607

(51) Int. Cl.
| | |
|---|---|
| *C01G 23/00* | (2006.01) |
| *C01G 23/047* | (2006.01) |
| *C25C 3/28* | (2006.01) |
| *C22B 34/12* | (2006.01) |
| *C22B 4/06* | (2006.01) |

(52) U.S. Cl.
CPC .............. *C01G 23/047* (2013.01); *C22B 4/06* (2013.01); *C22B 34/129* (2013.01); *C22B 34/1281* (2013.01); *C25C 3/28* (2013.01); *C01P 2002/50* (2013.01); *C01P 2002/52* (2013.01)

(58) Field of Classification Search
CPC ........... C01G 23/047; C22B 34/1263–34/1286
USPC ............................................... 423/69
See application file for complete search history.

(56) References Cited

U.S. PATENT DOCUMENTS

| | | | | |
|---|---|---|---|---|
| 3,502,460 A | * | 3/1970 | Hockin ............... | C22B 34/1218 423/598 |
| 5,411,719 A | * | 5/1995 | Hollitt ................. | C22B 34/1236 423/69 |
| 8,992,758 B2 | * | 3/2015 | Dudley .................... | C22B 4/08 205/367 |
| 2003/0047462 A1 | | 3/2003 | Ward-Close et al. | |

FOREIGN PATENT DOCUMENTS

| | | |
|---|---|---|
| GB | 1026691 A | 4/1966 |
| GB | 1 530 806 | 11/1978 |
| WO | WO 1999/064638 A1 | 12/1999 |
| WO | WO 2013/050772 A2 | 4/2013 |

OTHER PUBLICATIONS

Translation of CN 104445386 A, Mar. 25, 2015. (Year: 2015).*

* cited by examiner

*Primary Examiner* — Steven J Bos
(74) *Attorney, Agent, or Firm* — Cooley LLP; Ivor R. Elrifi; Matthew Pavao

(57) ABSTRACT

This invention relates broadly to the production of titanium alloys by electrolytic reduction processes, and is concerned in one or more aspects with the preparation of a feedstock for such processes. In other aspects, the invention relates to a novel synthetic rutile (SR) product and to methods of producing titanium alloy from titaniferous material.

6 Claims, No Drawings

SYNTHETIC RUTILE PRODUCTS AND PROCESSES FOR THEIR PRODUCTION

CROSS-REFERENCE TO RELATED APPLICATIONS

This application is a national stage application, filed under 35 U.S.C. 371, of International Application No. PCT/AU2016/050323, filed on May 5, 2016, which claims priority to, and the benefit of, Australian Patent Application No. 2015901607, filed May 5, 2015. The contents of each of these applications are incorporated by reference in their entirety.

FIELD OF THE INVENTION

This invention relates broadly to the production of titanium alloys by electrolytic reduction processes, and is concerned in one or more aspects with the preparation of a feedstock for such processes. In other aspects, the invention relates to a novel synthetic rutile (SR) product and to methods of producing titanium alloy from titaniferous material.

BACKGROUND OF THE INVENTION

There has been growing interest in the potential of electrolytic reduction processes (also sometimes referred to as electro-decomposition and electro-deoxidation see for example U.S. Pat. No. 8,992,758, the disclosure of which is hereby incorporated by reference) as a means of producing a range of metals, and alloys of those metals, from feedstocks comprising compounds, particularly oxides, of the metals. Such a process, commonly known as the FFC Cambridge process, is disclosed in international patent publication WO99/64638 (the disclosure of which is hereby incorporated by reference), which broadly describes a method for removing a substance X from a solid metal or semi-metal compound $M^1X$ via electrolysis in a melt of $M^2Y$. The substance X may be dissolved within $M^1$ or the compound $M^1X$ may be a surface coating on a body of $M^1$. The electrolysis is conducted under conditions such that reaction and therefore extraction of X rather than $M^2$ deposition occurs at an electrode surface (where typically the electrode is formed from the $M^1X$ material), and that X dissolves in the electrolyte $M^2Y$. The process is typically conducted at an elevated temperature, e.g. in the range 700° C.-1,000° C., above the melting point of $M^2Y$ but below its substantially higher boiling point. The elevated temperature is required to ensure an adequate rate of ionisation and diffusion of the substance X from the surface of the $M^1X$.

In practical terms, the substance X is oxygen and the process has been of particular interest for the purpose of producing titanium metal product. It is known that where a mixture of oxides are reduced by the process, an alloy of the reduced metals will form, and further known that the configuration of the oxides in the feedstock will be largely maintained in the metal alloy end product. The development of a range of titanium alloys has focused primarily around the manipulation of the phase structure of the metal to produce the desired properties (for example—strength, ductility, modulus, fatigue and corrosion) by alloying with elements that stabilise the alpha and beta phases. Alpha phase stabilisers are Al, Ge, Ga, Sn and Zr. Aluminium is particularly favoured due to cost. Beta phase stabilisers are predominantly transition elements and include Mo, V, Ta, Nb, Mn, Fe, Cr, W, Co, Ni, Cu and Si.

There has therefore been interest in developing titaniferous feedstocks for electrolytic reduction processes that contain alloying elements tailored to produce a desired end product alloy. Known primary feeds to the process for the purpose of producing titanium alloys include natural rutile and synthetic rutile (see for example WO2013/050772A3, the disclosure of which is hereby incorporated by reference) as well as the pure product from the $TiO_2$ pigment process, and efforts have been made to add the alloying elements discretely (also sometimes referred to doping) to the feed to the electrolysis cell. The alternative of adding alloying elements upstream of the electrolysis, while achieving diffusion and homogeneity in the grains, requires a costly high temperature treatment step.

Another possibility is to mix titanium metal powder with metal powders of the alloying elements downstream. However, this would require significant post processing to ensure homogeneity for developing the alloy properties, and would therefore involve similar issues to the adding of alloy powders to the rutile or synthetic rutile upstream of the electrolysis cell.

It is therefore an object of the invention to provide an economically attractive means of producing titanium alloys by an electrolytic reduction process (also known as electro-decomposition and electro-deoxidation processes).

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

The present applicant has realised that the aforementioned object can be met by preparing a feedstock for an electrolytic reduction process by incorporating additives in an otherwise conventional process for converting a titanium bearing material such as ilmenite to synthetic rutile. The invention thus also provides a novel synthetic rutile product and a process for the production of a new range of titanium alloys derived from synthetic rutile.

Applicant is aware of the use of additives in the conventional synthetic rutile process (known commonly as the 'Becher' process) or in similar processes for reducing titanium bearing materials. For example, it is known to add small amounts of sulphur for removing manganese impurity as manganese sulphide.

U.S. Pat. No. 5,411,719 discloses a form of modified 'Becher' process in which a magnesium or manganese oxide is added if necessary to a titaniferous material according to a prescribed formula, after which the mineral is heated in the presence of a reductant at a temperature (typically below 1200° C.) and for a time sufficient to permit contained iron to be reduced to its metallic form, which is removed by aqueous aeration or leaching, and contained titania to convert to an acid soluble form. In many cases, the additive is said to be unnecessary because there is sufficient magnesium and/or manganese in the feedstock. In the only specific example in which additive is provided, the feedstock is fine grained siliceous leucoxene, 82% $TiO_2$, and the additive dose is finely divided magnesite $MgCO_3$ or manganese oxide $MnO_2$, in both cases at 7.5 wt %.

A magnesium additive is also proposed in U.S. Pat. No. 3,502,460. In the process there described, a titaniferous mineral such as ilmenite or rutile is preheated in an oxidising atmosphere at a temperature within the range 950° C. to 1320° C. in the presence of a magnesium compound in an amount such that the mineral grains become coated with a zone of magnesian pseudobrookite. The product of the preheating stage is heated with a reducing agent at a temperature preferably in the range 1200° C. to 1300° C. to produce a mixture of metallic ion and anosovite. The addition of a sodium salt to the charge during the reduction step is said to be beneficial. The magnesium compound added in the preheating stage is normally a salt, preferably magnesium carbonate. The preferred amount is 0.6% to 3.0% MgO equivalent.

GB patent publication 1026691 relates to a process in which rutile is treated with magnesium for producing an acid soluble rutile. Broadly, the process includes treating the ore to remove iron from the ore, and prior to the reduction of iron species to iron metal, adding a magnesium compound in an amount of from 0.25 to 10 wt % MgO equivalent.

According to a first aspect of the invention, there is provided a method of preparing a synthetic rutile feedstock for an electrolytic reduction process, comprising:

treating a titaniferous material in a reducing atmosphere at an elevated temperature in the presence of a reductant whereby to convert the titaniferous material to a reduced titaniferous material in which iron oxides in the titaniferous material have been substantially reduced to metallic iron, and rutile in the titaniferous material has been reduced fully or partly to reduced rutiles, pseudobrookite or anosovite, and separating out the metallic iron so as to obtain a synthetic rutile product, wherein the treatment of the titaniferous material is effected in the presence of an added amount of one or more titanium alloying elements whereby the synthetic rutile product incorporates a proportion of the one or more titanium alloying elements for achieving a corresponding proportion of the one or more titanium alloying elements in a titanium alloy produced by reduction of the synthetic rutile product in an electrolytic reduction process; wherein at least one of the one or more titanium alloying elements is selected from the group consisting of: metals or metalloids; and wherein Mg and Mn are incorporated only in combination with an added amount of at least one further titanium alloying element of the one or more titanium alloying elements.

The term "metals" is understood to refer to any metallic element, such as alkali metals, alkaline earth metals, transition metals, post-transition metals, rare earth metals including lanthanides as well as scandium and Hafnium (although these two are also considered transition metals), and actinides. The term "metalloids" is understood to refer to elements including boron, silicon, germanium, arsenic, antimony, tellurium, selenium, and carbon.

It is preferred that at least one of the one or more titanium alloying elements is selected from the group consisting of: Al, Ca, Co, Cr, Cu, Fe, Ga, Ge, Mg, Mn, Mo, Nb, Ni, Pd, Ru, Si, Sn, Ta, V, W, and Zr. More preferably, at least one of the one or more titanium alloying elements is selected from the group consisting of Al, Ca, Co, Cr, Cu, Fe, Ga, Ge, Mo, Nb, Ni, Pd, Ru, Si, Sn, Ta, V, W, and Zr.

It is preferred that at least one of the one or more titanium alloying elements is added in an amount of 0.01 wt % or greater as an oxide equivalent. Preferably, 0.05 wt % or greater as an oxide equivalent. More preferably, 0.1 wt % or greater as an oxide equivalent. Most preferably 0.2 wt % or greater as an oxide equivalent.

The one or more titanium alloying elements may be added as a compound or an element. Where the titanium alloying element is in the form of a compound, the compound may for example be a metal or mixed metal oxide, ores, concentrates hydrate, sulphate, carbonate, chloride, or nitrate; in which case the oxide, hydrate, sulphate, carbonate, chloride, or nitrate is incorporated into the structure of the synthetic rutile product as the oxide or element. Thus, the synthetic rutile product may incorporate the titanium alloying element in the form of one or more of the compounds described above.

In an embodiment, the step of treating the titaniferous material is effected in the presence of an added amount of two or more titanium alloying elements. This results in a synthetic rutile product that incorporates a proportion of each of two or more titanium alloying elements. Where the synthetic rutile product incorporates a proportion of each of two or more titanium alloying elements, it is preferred that at least one of those elements is selected from the group consisting of: Co, Cr, Cu, Ga, Ge, Mo, Nb, Ni, Sn, Ta, V, and W. In still further embodiments, the step of treating the titaniferous material is carried out in the presence of an added amount of three or more titanium alloying elements, such as to result in a synthetic rutile product that incorporates a proportion of three or more titanium alloying elements.

In an embodiment, the method is a method of producing a titanium alloy from a synthetic rutile product formed according to the first aspect of the invention, and the method further includes reducing the synthetic rutile product to titanium metal by electrolysis in a fused salt electrolyte or a mixture of such salts, wherein the electrolysis is conducted under conditions such that oxygen in the synthetic rutile product is ionised and dissolved into the fused salt electrolyte at a surface of the synthetic rutile product in preference to deposition of a metal cation of the fused salt electrolyte.

In a second aspect, the invention also provides a method of producing a titanium alloy from a synthetic rutile product, comprising reducing the synthetic rutile product to the titanium alloy by electrolysis in a fused salt electrolyte or a mixture of such salts, wherein the electrolysis is conducted under conditions such that oxygen in the synthetic rutile product is ionised and dissolved into the fused salt electrolyte at a surface of the synthetic rutile product in preference to deposition of a metal cation of the fused salt electrolyte;

wherein the synthetic rutile product incorporates a proportion of one or more titanium alloying elements for achieving a corresponding proportion of the respective element(s) with the titanium metal whereby a titanium alloy containing the element(s) in said corresponding proportions is produced; and at least one of the one or more titanium alloying elements is selected from the group consisting of: metals and metalloids, and is incorporated in an amount greater than 0.5 weight percent as an oxide equivalent, and Al, Fe, Mg, Mn, and Si, are incorporated only in an amount of 2.5 wt %; or greater as an oxide equivalent, and Fe, Mg, and Mn are incorporated only in combination with at least one further titanium alloying element of the one or more titanium alloying elements.

In a third aspect, the invention provides a method of preparing a synthetic rutile feedstock for an electrolytic reduction process, comprising:

treating a titaniferous material in a reducing atmosphere at an elevated temperature in the presence of a reductant whereby to convert the titaniferous material to a reduced titaniferous material in which iron oxides in the titaniferous material have been substantially reduced to metallic iron and rutile in the titaniferous material has been reduced fully or partly to reduced rutiles, pseudobrookite or anosovite, and separating out the metallic iron so as to obtain a synthetic rutile product, wherein the titaniferous material treated is a blend of two of more ilmenites selected whereby the synthetic rutile product incorporates from the ilmenites a proportion of each of one or more titanium alloying elements for achieving corresponding proportion(s) of the respective element(s) in a titanium alloy produced by reduction of the synthetic rutile product in an electrolytic reduction process.

The invention also provides, in its third aspect, a method of producing a titanium alloy from a titaniferous material comprising:

treating a titaniferous material in a reducing atmosphere at an elevated temperature in the presence of a reductant whereby to convert the titaniferous material to a reduced titaniferous material in which iron oxides in the titaniferous material have been substantially reduced to metallic iron and rutile in the titaniferous material has been reduced fully or partly to reduced rutiles, pseudobrookite or anosovite, and separating out the metallic iron so as to obtain a synthetic rutile product, reducing the synthetic rutile product to the titanium alloy by electrolysis in a fused salt electrolyte or a mixture of such salts, wherein the electrolysis is conducted under conditions such that oxygen in the synthetic rutile product is ionised and dissolved into the fused salt electrolyte at a surface of the synthetic rutile product in preference to deposition of a metal cation of the fused salt electrolyte, wherein the titaniferous material treated is a blend of two of more ilmenites selected whereby the synthetic rutile product incorporates from the ilmenites a proportion of each of one or more titanium alloying elements for achieving corresponding proportion(s) of the respective element(s) with the titanium metal whereby to produce a titanium alloy containing the element.

In an embodiment of the first and third aspects, the titaniferous material is ilmenite.

In an embodiment of the first and third aspects, the elevated temperature of the treatment of the titaniferous material is in the range about 1075° C. to about 1300° C.

In an embodiment the treatment is effected in the presence of added amounts of two or more titanium alloying elements whereby the synthetic rutile product incorporates respective proportions of the elements for achieving corresponding proportions of the respective elements in a titanium alloy produced by reduction of the synthetic rutile product in an electrolytic reduction process.

In a fourth aspect, the invention provides a synthetic rutile product that incorporates a proportion of one or more titanium alloying elements for achieving a corresponding proportion of that element in a titanium alloy produced by reduction of the synthetic rutile product in an electrolytic reduction process; wherein at least one of the one or more titanium alloying elements is selected from the group consisting of: metals and metalloids, and is incorporated in an amount of 0.5 weight percent or greater as an oxide equivalent, wherein Al, Fe, Mg, Mn, and Si, are incorporated only in an amount of 2.5 wt % or greater as an oxide equivalent and Fe, Mg, and Mn are incorporated only in combination with at least one further titanium alloying element of the one or more titanium alloying elements. Preferably, the one or more titanium alloying elements is selected from the group consisting of: Al, Ca, Co, Cr, Cu, Fe, Ga, Ge, Mg, Mn, Mo, Nb, Ni, Pd, Ru, Si, Sn, Ta, V, W, and Zr.

In an embodiment, at least one of the one or more titanium alloying elements is selected from the group consisting of Al, Co, Cr, Cu, Mg, Mn, Mo, Nb, Ni, Sn, Ta, V, W, and Zr. Preferably, at least one of the one or more titanium alloying elements is selected from the group consisting of Al, Mo, Sn, or V.

In an embodiment, Al, Fe, Mg, Mn, and Si are incorporated only in combination with the at least one further alloying element.

In an embodiment, the further alloying element is not Fe, Mg, or Mn. Preferably, the further alloying element is not Al, Fe, Mg, Mn, and Si. More preferably, the further alloying element is selected from the group consisting of: Co, Cr, Cu, Ga, Ge, Mo, Nb, Ni, Sn, Ta, V, W, and Zr.

In an embodiment, the at least one of the one or more titanium alloying elements is included in an amount 0.6 weight percent or greater as the oxide equivalent. More preferably, 0.7 weight percent or greater as the oxide equivalent. Even more preferably, 0.8 weight percent or greater as the oxide equivalent. Most preferably, 1 weight percent or greater as the oxide equivalent.

In a fifth aspect of the invention, there is provided a method of producing a titanium alloy from a synthetic rutile product, such as the synthetic rutile product as described above, the method comprising reducing the synthetic rutile product to the titanium metal alloy by electrolysis. Furthermore, the skilled addressee will appreciate that a range of different titanium alloys may be formed according to this method.

DETAILED DESCRIPTION OF THE EMBODIMENTS

Preferably, the titanium alloying element is incorporated into the synthetic rutile product such that the element is distributed homogenously throughout the grain structure of the synthetic rutile product. In other words, the element does not form discrete inclusions in the synthetic rutile product structure or discrete physical forms on the respective grains e.g. a coating or other discrete zone of the element. It is believed by the applicant that if this homogenous distribution is achieved in the synthetic rutile product structure, it is carried through the electrolytic reduction step into the titanium alloy structure, which is thereby a homogenous solid state solution of the element(s) in the titanium metal.

The preferred amount of the compound added should take account of the known or determined presence of the element in the titaniferous feed material. It is found that there may be a substantially linear relationship between the amount of the added compound and the additional proportion of the element consequently incorporated into the synthetic rutile product.

It is thought that the mechanism for the uptake of the added element(s) into the synthetic rutile product structure is probably via the formation of an $M_3O_5$ phase, but this may be dependent on a range of factors and may not be the mechanism over the full range of operating conditions. Such a phase, which may be a pseudobrookite phase, is known to be generally stabilised by a range of elements and in certain conditions can be acid soluble. It is also known that various forms of reduced rutile ($TiO_{2-x}$, where x can vary from 0 to 0.5) can take up these same elements.

Titanium alloying elements of particular interest are metals, semi-metals and transitions elements, including (but not restricted to) Al, Co, Cr, Cu, Fe, Ga, Ge, Mg, Mn, Mo, Nb, Ni, Pd, Ru, Si, Sn, Ta, V, W, and Zr. Of particular interest are Al, Co, Cr, Cu, Mg, Mn, Mo, Nb, Ni, Sn, Ta, V, W, and Zr.

The titanium alloying element may be added in elemental form, as a mineral, or as a compound with the ilmenite during the reduction process. Suitable compounds for these elements include their individual or mixed metal oxides, ores, concentrates, hydrates, sulphates, carbonates, halides (in particular chlorides), nitrates or complex compounds (for example aluminium molybdate) Mixtures such as mixtures of aluminium, molybdenum, and or vanadium oxides are also suitable.

Typical added amounts of the total titanium alloying elements are up to 20 wt % in terms of oxide equivalent with respect to the feed titaniferous material, itself typically ilmenite, and more commonly in the range 3% to 10 wt % in terms of oxide equivalent. Thus, the synthetic rutile product will typically contain the titanium alloying elements at up to about 30 wt % as the oxide equivalent, and more commonly in the range of 4.3 to 14.3 wt % in terms of oxide equivalent. Standard synthetic rutile has a typical $TiO_2$ content of at least 85 wt %, thus the inclusion of up to 20 wt % of an additive will result in a synthetic rutile product with a $TiO_2$ content of at least 65 wt %, and more commonly in the range of 70 to 90 wt % $TiO_2$.

The form of the additives (i.e. powder, coarse particles, minerals, solution, slurry etc.) is not limited—i.e. a wide range of means of addition are possible. However, there is some evidence that the uptake of elements into the structure is more effective with finer sized additives than with coarser sizes and some forms (e.g. the salts) may be more mobile than pure oxides (e.g. dead-burned oxides such as $Al_2O_3$, CaO and MgO). Where the additives are a solution or slurry, the additives may advantageously be sprayed on to the surface of the titanium bearing material (such as ilmenite).

The proportion of the titanium alloying element(s), and therefore the added amounts(s) of the compound(s) of the element(s), is preferably predetermined to achieve the desired corresponding proportion of the respective element in the titanium alloy produced by reduction of the synthetic rutile product in an electrolytic reduction process to achieve the desired titanium alloy structure and/or mechanical properties.

The reductant is conveniently a carbonaceous reductant, preferably coal, and this coal may be selected for a gasification reactivity that results in reducing conditions in which the reduced ilmenite includes a sufficient; optionally major, proportion of a titanium phase of general formula $M_3O_5$ incorporating the added element into the structure of the synthetic rutile product. The gasification reactivity of the coal may be relatively high, by which is meant in the context of the specification significantly higher than the average of all coals. In practical terms, this means that the gasification reactivity is towards the higher end of the range of gasification reactivity found in coals.

Hydrogen may alternatively be employed as the reductant.

The elevated temperature of the treatment of the ilmenite or titaniferous material is preferably in the range 1075° C.-1300° C. where a carbonaceous reductant is employed, more preferably 1100° C. to 1200° C. and most preferably in the range 1150° C. to 1170° C. Where the reductant is hydrogen, the temperature is preferably in the range 600° C.-900° C., more preferably 750° C.-900° C.

The duration of the treatment of the titaniferous material at the elevated temperature may typically be in the range 2 to 12 hours, preferably 3 to 8 hours, more preferably 4 to 6 hours. The longer the duration, the greater the take up of the titanium alloying element, but there is typically a treatment time for which a longer time does not achieve a sufficient overall benefit.

Typically, the reduced ilmenite is cooled in a manner to prevent or minimise re-oxidation of metallic iron before separating out the metallic iron.

Preferably, the treatment of the titaniferous material is carried out in an inclined rotary kiln of the kind normally employed for the Becher process. Alternatively, the treatment could be carried out using hydrogen as the reductant in a fluidised bed reactor or circulating fluid bed reactor or several such reactors in series. The material recovered from the discharge of the kiln is known as reduced ilmenite, a mix in this case of metallic iron and titanium oxides with the added element(s) and a residual content of iron oxide and other impurities. The metallic iron removal step may be any suitable separation method including those employed in Becher reduction processes. A typical such method is an aqueous oxidation step in which the metallic iron is oxidised or rusted to $Fe_2O_3$ or $Fe_3O_4$ in a dilute aqueous solution of ammonium chloride catalyst. An alternative method for the metallic iron removal step could be that of pressure oxidation using dilute sulphuric acid. A further alternative or additional contaminant removal step may entail an acid leach or wash, typically employing sulphuric or hydrochloric acid.

Doping ilmenite with certain metal oxides during ilmenite reduction allows the fabrication of a tailored synthetic rutile feedstock, ideal for electro-deoxidation. Incorporation of both alpha (Al, Zr & Sn) and beta (Fe, Ni, Cr, Mo, Nb, Ta, W, V, Mn and Cr) stabilising elements in to the synthetic rutile leads to the generation of a titanium alloy, post electrolytic reduction, exhibiting enhanced properties (for example—strength, ductility, modulus, fatigue & corrosion) compared to the baseline scenario of synthetic rutile with no additions. Furthermore the diffusion of oxygen in the beta phase of titanium is higher than for alpha alone, therefore inclusion of one or more of Fe, Ni, Cr, Mo, Nb, Ta, W, V, Mn and Cr, can reduce electrolytic reduction times, leading to improved productivity.

The electrolytic reduction step or process may conveniently be a process as disclosed in international patent publication WO99/64638, or in subsequent modifications and improvements of that process. Suitable electrolytes include the chloride salts of barium, calcium, caesium, lithium, sodium, strontium and yttrium. The temperature at which the electrolytic reduction is conducted may be in the range 700° C. to 1000° C. It will be understood that the synthetic rutile product containing the added element serves as the cathode. A variety of shapes of the cathode is described in the aforementioned international patent publication. However, the as provided synthetic rutile is also acceptable, e.g. laid on a perforated stainless steel cathode tray. The applied potential may typically be in the range 2.5 volts to 3.5 volts. This potential is maintained and controlled potentiostatically so that only oxygen ionisation occurs in preference to the more usual deposition of the cations in the fused salt.

The fifth aspect of the invention derives in part from the observation that elements such as Mg migrate in the reduction treatment from a high MgO ilmenite to a low MgO ilmenite.

The process of the invention allows titanium alloys to be produced by the electrolytic reduction process with required and predicted proportions of alloying elements without needing to resort to problematic means of adding the elements downstream or upstream of the electrolytic reduction process. In particular, a costly high temperature addition step upstream of the process is avoided. Importantly, it is believed possible to add the elements in the step of producing synthetic rutile product feed for the process so that the elements are distributed homogenously in the synthetic rutile product structure and this homogeneity is carried over into the solid state solution of the alloy following the electrolytic reduction.

EXAMPLES

A number of laboratory scale tests were carried out comprising small scale treatment of ilmenite samples to obtain reduced ilmenite with incorporated additives. All of the tests was undertaken using a rotating silicon carbide pot housed within a temperature controlled box furnace. Heating programs were used to ramp up the furnace temperature to the set point temperature over a period of 6 hours and then the furnace was held at this temperature for 3 to 10 hours. At the end of 9 to 16 hours, the furnace was switched off and the pot contents were cooled to room temperature under nitrogen. Samples were removed periodically from the pot during reduction in order to monitor the reduction process. The bulk reduced ilmenite from the pot test was screened at 425 microns to remove the char and magnetically separated to reject the non-magnetic fine char, coal ash oxides and excess additives. The reduced ilmenite was aerated in an agitated vessel containing an aqueous solution of ammonium chloride (13 g/L) at 70° C. with injected air for periods up to 9 hours to oxidise and remove the metallic iron from the reduced ilmenite grains. The aeration was completed when the oxidation-reduction potential (ORP) becomes positive. The wet aerated products (synthetic rutile and iron oxides) are separated using a 53 micron sieve. The synthetic rutile was dried, weighed and assayed.

For each test, 700 g of ilmenite, and the required quantities of coal and the additive(s) were weighed and mixed before they were added to the silicon carbide pot. Three different ilmenites were used: ilmenite 1 was a primary ilmenite, while ilmenites 2 and 3 were secondary ilmenites. Their respective main component compositions are set out in Table 2. Collie (Western Australia) coal of the composition set out in Table 3 was used as the carbonaceous reductant in the tests.

21 tests were carried out using different additives and under a variety of test conditions. The results are set out in Table 1. Tests 1, 3, and 14 were reference tests for ilmenites 1, 2, and 3 respectively with no additives to establish a base value for the content of the relevant added element in the synthetic rutile. Test 2 was carried out using ilmenite 1 in the presence of an additive, tests 4 to 13 were carried out using ilmenite 2 in the presence of additive(s), and tests 15 to 21 were carried out using ilmenite 3 in the presence of additive(s).

The results in Table 1 indicate that under similar laboratory test conditions alumina additions to the three ilmenites resulted in similar aluminium contents in the synthetic rutile product (3.9 to 4.1%). Mo, V and Sn oxide additions to the two secondary ilmenites resulted in similar final synthetic rutile additive uptakes. The combination of different oxides or multiple metal oxide compounds can increase the uptake of the additives into the final synthetic rutile product (e.g. $Al_2O_3$ or $Al(OH)_3+V_2O_5$, $CaMoO_4$) while other combinations (e.g. $Al_2O_3$ or $Al(OH)_3+MoO_3$) can achieve lower uptakes of one or both of the additives. Different metal oxide additives can have an impact on the uptake of the additive into the final synthetic rutile product (e.g. $Al_2O_3$ compared to $Al(OH)_3$ for both secondary ilmenites).

TABLE 1

| Test No | Ilmenite | Coal (g) | Additive(s) | Addition (g) | Temperature ° C. | Time (h) | Synthetic Rutile Composition (%) | | | |
|---|---|---|---|---|---|---|---|---|---|---|
| | | | | | | | Al | Mo | V | Sn |
| 1 | 1 | 544 | Nil | 0 | 1200 | 16 | 0.59 | <0.01 | 0.22 | 0.006 |
| 2 | 1 | 544 | $Al_2O_3$ | 50 | 1200 | 16 | 4.1 | <0.01 | 0.19 | 0.004 |
| 3 | 2 | 413 | Nil | 0 | 1200 | 16 | 0.6 | <0.01 | 0.21 | 0.002 |
| 4 | 2 | 413 | $SnO_2$ | 21 | 1170 | 9 | 0.49 | <0.01 | 0.17 | 2.630 |
| 5 | 2 | 413 | $SnO_2$ | 21 | 1200 | 16 | 0.57 | <0.01 | 0.19 | 2.300 |
| 6 | 2 | 413 | $Al(OH)_3$ | 25 | 1200 | 16 | 0.91 | <0.01 | 0.2 | 0.005 |
| 7 | 2 | 413 | $Al(OH)_3$ | 70 | 1200 | 16 | 1.75 | <0.01 | 0.19 | 0.014 |
| 8 | 2 | 413 | $Al_2O_3$ | 50 | 1200 | 16 | 3.88 | <0.01 | 0.21 | 0.009 |
| 9 | 2 | 413 | $Al_2O_3 + MoO_3$ | 50 + 55 | 1200 | 16 | 2.48 | 1.94 | 0.18 | 0.010 |
| 10 | 2 | 413 | $MoO_3$ | 55 | 1200 | 16 | 0.54 | 2.22 | 0.18 | 0.008 |
| 11 | 2 | 413 | $CaMoO_4$ | 25 | 1200 | 16 | 0.51 | 1.42 | 0.18 | 0.004 |
| 12 | 2 | 413 | $V_2O_5$ | 42 | 1200 | 16 | 0.44 | <0.01 | 1.50 | 0.008 |
| 13 | 2 | 413 | $Al_2O_3 + V_2O_5$ | 50 + 42 | 1200 | 16 | 4.53 | <0.01 | 4.34 | 0.002 |
| 14 | 3 | 488 | Nil | 0 | 1200 | 16 | 0.57 | <0.01 | 0.16 | 0.002 |
| 15 | 3 | 488 | $SnO_2$ | 21 | 1200 | 16 | 0.47 | <0.01 | 0.14 | 2.060 |
| 16 | 3 | 488 | $Al(OH)_3$ | 70 | 1200 | 16 | 2.41 | <0.01 | 0.16 | 0.011 |
| 17 | 3 | 488 | $Al_2O_3$ | 50 | 1200 | 16 | 3.94 | <0.01 | 0.15 | 0.002 |
| 18 | 3 | 488 | $MoO_3$ | 55 | 1200 | 16 | 0.54 | 2.19 | 0.13 | 0.008 |
| 19 | 3 | 488 | $V_2O_5$ | 42 | 1200 | 16 | 0.5 | 0.01 | 1.56 | 0.008 |
| 20 | 3 | 488 | $Al(OH)_3 + MoO_3$ | 70 + 55 | 1200 | 16 | 1.71 | 1.00 | 0.15 | 0.008 |
| 21 | 3 | 488 | $Al(OH)_3 + V_2O_5$ | 70 + 42 | 1200 | 16 | 1.8 | 0.01 | 2.89 | 0.007 |

TABLE 2

| Component | Ilmenite 1 (wt %) | Ilmenite 2 (wt %) | Ilmenite 3 (wt %) |
|---|---|---|---|
| $TiO_2$ | 55.2 | 61.9 | 56.8 |
| $Fe_2O_3$ | 37.4 | 32.1 | 39.0 |
| MnO | 1.0 | 1.1 | 1.25 |
| MgO | 1.9 | 0.20 | 0.21 |
| $Al_2O_3$ | 1.2 | 0.66 | 0.54 |
| $SiO_2$ | 0.93 | 0.66 | 0.79 |

TABLE 3

| Component | Value (wt %) |
|---|---|
| Fixed | 45.0 |
| Volatiles | 26.3 |
| Ash | 3.1 |
| Moisture | 25.1 |
| $TiO_2$ | 0.07 |
| $Fe_2O_3$ | 0.47 |
| MnO | 0.002 |
| MgO | 0.08 |
| $Al_2O_3$ | 1.07 |
| $SiO_2$ | 1.24 |

As used herein, except where the context requires otherwise, the term "comprise" and variations of the term, such as "comprising", "comprises" and "comprised", are not intended to exclude further additives, components, integers or steps.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method of preparing a synthetic rutile feedstock for an electrolytic reduction process, comprising:

treating a titaniferous material in a reducing atmosphere at an elevated temperature in the presence of a reductant to convert the titaniferous material to a reduced titaniferous material in which iron oxides in the titaniferous material have been reduced to metallic iron, and rutile in the titaniferous material has been reduced to reduced rutiles, pseudobrookite or anosovite, and separating out the metallic iron so as to obtain a synthetic rutile product, wherein the treatment of the titaniferous material is effected in the presence of an added amount of one or more titanium alloying elements, whereby the synthetic rutile product incorporates a proportion of the one or more titanium alloying elements for achieving a corresponding proportion of the one or more titanium alloying elements in a titanium alloy produced by reduction of the synthetic rutile product in an electrolytic reduction process;

wherein at least one of the one or more titanium alloying elements is selected from the group consisting of: metals and metalloids; and wherein Mg and Mn are added only in combination with the added amount of one or more titanium alloying elements.

2. The method of claim 1, wherein the synthetic rutile product comprises at least 65 wt % $TiO_2$.

3. The method of claim 1, wherein the added amount of at least one of the one or more titanium alloying elements is at least 0.2 weight percent as an oxide equivalent.

4. The method of claim 3, wherein at least one of the one or more titanium alloying elements is selected from the group consisting of Al, Ca, Co, Cr, Cu, Fe, Ga, Ge, Mo, Nb, Ni, Pd, Ru, Si, Sn, Ta, V, W, and Zr.

5. The method of claim 1, wherein at least one of the one or more titanium alloying elements is selected from the group consisting of Al, Ca, Co, Cr, Cu, Fe, Ga, Ge, Mo, Nb, Ni, Pd, Ru, Si, Sn, Ta, V, W, and Zr.

6. The method of claim 1, wherein the one or more titanium alloying elements are added as a metal or mixed metal oxide, ore, concentrate, hydrate, sulphate, carbonate, chloride, or nitrate.

* * * * *